(12) United States Patent
Kreuger

(10) Patent No.: US 12,352,248 B2
(45) Date of Patent: Jul. 8, 2025

(54) ENERGY STORAGE AND RETRIEVAL SYSTEMS AND METHODS

(71) Applicant: Sten Kreuger, Chonburi (TH)

(72) Inventor: Sten Kreuger, Chonburi (TH)

( * ) Notice: Subject to any disclaimer, the term of this patent is extended or adjusted under 35 U.S.C. 154(b) by 0 days.

(21) Appl. No.: 18/731,398

(22) Filed: Jun. 3, 2024

(65) Prior Publication Data

US 2024/0318638 A1    Sep. 26, 2024

Related U.S. Application Data

(63) Continuation of application No. 18/337,561, filed on Jun. 20, 2023, now Pat. No. 12,037,990.

(Continued)

(51) Int. Cl.
*F03G 4/06* (2006.01)
*F01D 15/08* (2006.01)
(Continued)

(52) U.S. Cl.
CPC .............. *F03G 4/063* (2021.08); *F01D 15/08* (2013.01); *F04F 13/00* (2013.01); *F28D 20/0034* (2013.01)

(58) Field of Classification Search
CPC .......... F03G 4/063; F01D 15/08; F04F 13/00; F28D 20/0034
See application file for complete search history.

(56) References Cited

U.S. PATENT DOCUMENTS

| 1,955,261 A | 1/1932 | Tryon et al. |
| 2,443,295 A | 5/1944 | Bisch |

(Continued)

FOREIGN PATENT DOCUMENTS

| CA | 1126523 | 6/1982 |
| EP | 2778406 A1 | 9/2014 |

(Continued)

OTHER PUBLICATIONS

T. Steinparzer et al.; 2012 "Heat exchangers and thermal energy storage concepts for the off-gas heat of steelmaking devices"; J. Phys.: Conf. Ser., vol. 395 012158.

(Continued)

*Primary Examiner* — Shafiq Mian
(74) *Attorney, Agent, or Firm* — Andrew D. Fortney; Central California IP Group, P.C.

(57) ABSTRACT

Energy storage and retrieval systems are disclosed, along with methods of storing and retrieving the energy. The systems include an energy storage system and a trilateral cycle. The energy storage system includes low- and high-temperature energy storage tanks storing one or more energy storage media that exchange heat with a working fluid in both a gradient heat exchanger and a substantially isothermal heat exchanger in the trilateral cycle. Pressure changing devices transport the energy storage medium/media between the storage tanks and through the heat exchangers. The working fluid rejects heat to the energy storage medium and drives a turbine when the system is charging, and the energy storage medium rejects heat to the working fluid when the system is discharging. In some embodiments, the energy storage medium drives a second turbine when the system is discharging.

14 Claims, 11 Drawing Sheets

Related U.S. Application Data

(60) Provisional application No. 63/374,958, filed on Sep. 8, 2022.

(51) Int. Cl.
  *F03G 4/00* (2006.01)
  *F04F 13/00* (2009.01)
  *F28D 20/00* (2006.01)

(56) References Cited

U.S. PATENT DOCUMENTS

| | | | |
|---|---|---|---|
| 2,621,903 | A | 12/1952 | Cohler |
| 4,054,124 | A | 10/1977 | Knoos |
| 4,089,744 | A | 5/1978 | Cahn |
| 4,166,361 | A | 9/1979 | Earnest et al. |
| 4,262,657 | A | 4/1981 | McCullough et al. |
| 4,285,203 | A | 8/1981 | Vakil |
| 4,523,637 | A | 10/1985 | Abramo |
| 4,557,112 | A | 12/1985 | Smith |
| 4,827,735 | A | 5/1989 | Foley |
| 4,873,828 | A | 10/1989 | Laing et al. |
| 4,945,010 | A | 7/1990 | Kaufman et al. |
| 5,181,560 | A | 1/1993 | Burn |
| 5,222,298 | A | 6/1993 | Schatz |
| 5,239,833 | A | 8/1993 | Fineblum |
| 5,404,941 | A | 4/1995 | Jacksits |
| 5,441,097 | A | 8/1995 | Kanda et al. |
| 5,720,339 | A | 2/1998 | Glass et al. |
| 7,481,057 | B2 | 1/2009 | Patwardhan |
| 7,637,457 | B2 | 12/2009 | Bennett |
| 7,845,172 | B2 | 12/2010 | Goldman |
| 7,971,057 | B2 | 7/2011 | Masada |
| 8,250,847 | B2 | 8/2012 | Rapp et al. |
| 8,443,605 | B2 | 5/2013 | Ruer |
| 8,584,463 | B2 | 11/2013 | Hemrle et al. |
| 8,656,712 | B2 | 2/2014 | Howes et al. |
| 8,739,512 | B2 | 6/2014 | Mills |
| 8,826,664 | B2 | 9/2014 | Howes et al. |
| 9,038,390 | B1 | 5/2015 | Kreuger |
| 2003/0066633 | A1 | 4/2003 | Lee et al. |
| 2005/0103465 | A1 | 5/2005 | Brasz |
| 2008/0219651 | A1 | 9/2008 | Nayef |
| 2010/0276131 | A1 | 11/2010 | Barwig et al. |
| 2010/0301614 | A1 | 12/2010 | Ruer |
| 2010/0307169 | A1 | 12/2010 | Diaz |
| 2011/0100611 | A1 | 5/2011 | Ohler et al. |
| 2011/0139407 | A1* | 6/2011 | Ohler ............... F01K 3/006 165/104.28 |
| 2011/0286724 | A1 | 11/2011 | Goodman |
| 2012/0060501 | A1 | 3/2012 | Hemrle et al. |
| 2012/0216536 | A1 | 8/2012 | Ma et al. |
| 2013/0087301 | A1 | 4/2013 | Hemrle et al. |
| 2013/0111903 | A1 | 5/2013 | Stiesdal |
| 2013/0147197 | A1 | 6/2013 | Goebel et al. |
| 2013/0205778 | A1 | 8/2013 | Hansen |
| 2013/0216445 | A1 | 8/2013 | Hartvigsen et al. |
| 2014/0008033 | A1 | 1/2014 | Howes et al. |
| 2014/0060051 | A1 | 3/2014 | Ohler et al. |
| 2014/0110080 | A1 | 4/2014 | Bergan |
| 2014/0245756 | A1 | 9/2014 | Morgan et al. |
| 2015/0059342 | A1 | 3/2015 | Kruger et al. |
| 2015/0260463 | A1 | 9/2015 | Laughlin et al. |
| 2015/0300719 | A1 | 10/2015 | Strickland et al. |
| 2016/0298498 | A1* | 10/2016 | Kreuger ............... F03G 6/068 |

FOREIGN PATENT DOCUMENTS

| | | |
|---|---|---|
| GB | 423093 | 4/1933 |
| WO | 2014052927 A1 | 4/2014 |

OTHER PUBLICATIONS

Mehalic, B.; "Solar Hot Water Storage"; Home Power magazine; Jun./Jul. 2009; 5 pgs.; downloaded from homepower.com.

"How Thermal Energy Storage Works"; published on or around Aug. 31, 2018, by Calmac, Fair Lawn, NJ.

\* cited by examiner

CHARGING →

DISCHARGING ⇒

CHARGING ⟶
DISCHARGING ⇢

CHARGING →
DISCHARGING →

ENERGY STORAGE AND RETRIEVAL SYSTEMS AND METHODS

RELATED APPLICATION(S)

The present application is a continuation of U.S. patent application Ser. No. 18/337,561, filed Jun. 20, 2023, pending, which claims priority to U.S. Provisional Pat. Appl. No. 63/374,958, filed Sep. 8, 2022, expired, both of which are incorporated herein by reference in their entireties. The present application may also be related to U.S. patent application Ser. No. 15/424,036, filed Feb. 3, 2017, abandoned, the relevant portions of which are incorporated herein by reference.

FIELD OF THE INVENTION

The present invention generally relates to the field of energy storage and retrieval. More specifically, embodiments of the present invention pertain to a method and system for pumped thermal energy storage and retrieval.

DISCUSSION OF THE BACKGROUND

The demand for inexpensive energy storage and retrieval is great now. The cost of fossil fuels and hydrocarbon gasses is high, and their availability is low, particularly in Europe. This is having extraordinary effects on the price and availability of electricity, particularly in times of high demand.

U.S. Pat. No. 8,584,463 discloses a system and method for storing and retrieving thermoelectric energy. The system includes a working fluid that is circulated through first and second heat exchangers, and a thermal storage medium that is circulated through the first heat exchanger. The second heat exchanger is in connection with a first thermal bath during a charging cycle and with a second thermal bath during a discharging cycle. In this way, roundtrip efficiency is improved through minimizing the temperature difference between the first thermal bath and the hot storage tank during charging, and maximizing the temperature difference between the second thermal bath and the hot storage tank during discharging. The system and method appear to operate in a quasi-trilateral cycle. Such a cycle is known as a transcritical cycle.

U.S. Pat. Appl. Publ. No. 2011/0139407 discloses a trilateral cycle (see FIG. 1A) for thermoelectric energy storage in liquids. In the trilateral cycle of FIG. 1A, 1-2 represents a process that increases the temperature of the working fluid slightly without changing the entropy, 2-3 represents an isobaric, increasing temperature gradient heat transfer process, 3-4 represents an adiabatic expansion process, and 4-1 represents an isothermal, isobaric heat transfer process (i.e., heat transfer to another medium; e.g., as a result of a phase change of the working fluid in the cycle from gas to liquid). The heat added to the cycle from a heat source is $Q_{in}=Q_{2-3}$. The heat delivered from the cycle to a heat sink is $Q_{out}=Q_{4-1}$. The mechanical power added to the cycle is $W_1=W_{1-2}$. The mechanical power produced by and/or transferred within the system is $W_2=W_{3-4}$.

Since the cycle is reversible, the diagram of FIG. 1A also shows a trilateral heat pump cycle with a constant temperature heat source and a gradient heat sink when operating in the opposite direction (counter-clockwise) as a heat pump. In the reverse cycle, 4-3 represents an adiabatic compression, 3-2 represents an isobaric, decreasing temperature gradient heat transfer process, 2-1 represents a pressure recovery process, and 1-4 represents an isothermal and isobaric heat transfer (e.g., phase change from liquid to gas). The heat added to the cycle from a heat source is $Q_{in}=Q_{1-4}$. The heat delivered from the cycle to a heat sink is $Q_{out}=Q_{3-2}$. The mechanical power added to the cycle is $W_1=W_{4-3}$. The mechanical power delivered from the cycle is $W_2=W_{2-1}$.

FIG. 1B shows a trilateral entropy diagram (i.e., temperature vs. entropy plots) for dimethyl ether (DME) as the heat transfer medium at different maximum pressures (0.25-100 bar). The largest triangle is for a completely charged two-tank system, and the plot shown as a tilted bell-shaped curve (the lowest curve without a linear section) is for a completely discharged system. The thick line shows a trilateral cycle in which 1'-2' represents a process that increases the temperature of the working fluid slightly without changing the entropy, 2'-3' represents an increasing temperature gradient heat transfer process at 100 bar, 3'-4' represents an adiabatic expansion process (i.e., at constant entropy), and 4'-1' represents an isothermal heat transfer process at 0° C. that begins at 2.7 bar. In the reverse cycle, 4'-3' represents an adiabatic compression (at constant entropy) that begins at 2.7 bar, 3'-2' represents a decreasing temperature gradient heat transfer process at 100 bar, 2'-1' represents a pressure recovery process, and 1'-4' represents an isothermal heat transfer (e.g., phase change from liquid to gas) at 0° C.

One difference between the trilateral cycle 1-2-3-4 in FIG. 1A and the trilateral cycle 1'-2'-3'-4' in FIG. 1B is that the trilateral cycle in FIG. 1A is a flash cycle, and the trilateral cycle in FIG. 1B is a dry cycle. The flash cycle in FIG. 1A includes a displacement expander (e.g., for the process 2-1), whereas the dry cycle in FIG. 1B can have a turbine expander (e.g., for the process 2'-1'). When using DME as the working fluid, dry expansion is beneficial for systems including a turbine, especially when the power requirement is large The cycle as shown in FIG. 1B is when the system is fully charged. When the system in FIG. 1B is discharged, the temperature of the isothermal heat transfer increases (e.g., to a temperature of about 47° C.), the gradient heat transfer processes still occur at 100 bar, the adiabatic pressure changing processes occur at a lower entropy (e.g., at about 175 KJ/kg-K), and the transition between an adiabatic pressure changing process and the isothermal heat transfer occurs at a higher pressure (e.g., at about 10 bar).

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to methods and systems for pumped thermal energy storage and retrieval. The present system is closed, and does not require the environment (e.g., as a heat source or heat sink), which gives a great freedom of choice (e.g., in system placement and design). The present methods and system may take or absorb heat from the surrounding environment at initial startup, and eject heat from losses after each cycle of operation, but the surrounding environment is not necessarily a thermal bath (e.g., as disclosed in U.S. Pat. No.

8,584,463). Most existing thermal storage and retrieval systems use the environment as a temperature and/or heat source.

In one aspect, the invention relates to an energy storage and retrieval system, comprising an energy storage and retrieval system and a trilateral cycle. In one aspect, the energy storage and retrieval system comprises a first low-temperature energy storage tank, a high-temperature energy storage tank, and one or more first pressure changing devices. The trilateral cycle comprises a gradient heat exchanger, a substantially isothermal heat exchanger, a compressor/expander in fluid communication with the gradient heat exchanger and the substantially isothermal heat exchanger, and one or more second pressure changing devices between and in fluid communication with the gradient heat exchanger and the substantially isothermal heat exchanger. The first low-temperature energy storage tank stores a first energy storage medium at a first temperature. The high-temperature energy storage tank stores the first energy storage medium at a second temperature, and has a pressurized gas therein. The second temperature is higher than the first temperature. The first pressure changing device(s) are configured to transport the first energy storage medium between the first low-temperature energy storage tank and the high-temperature energy storage tank. The first energy storage medium passes through the gradient heat exchanger, which is configured to exchange heat between the first energy storage medium and the working fluid over a temperature range. Either a second energy storage medium or the first energy storage medium passes through the substantially isothermal heat exchanger. The substantially isothermal heat exchanger is configured to exchange heat at a substantially constant temperature between the working fluid and the first or second energy storage medium. The compressor/expander is in fluid communication with both the gradient heat exchanger and the substantially isothermal heat exchanger, and is configured to change a pressure of the working fluid between the gradient heat exchanger and the substantially isothermal heat exchanger. The second pressure changing device(s) are configured to transport the working fluid from the substantially isothermal heat exchanger to the gradient heat exchanger when the energy storage and retrieval system is discharging, and from the gradient heat exchanger to the substantially isothermal heat exchanger when the energy storage and retrieval system is charging. The first energy storage medium may comprise water.

In one or more other or further embodiments, the first low-temperature energy storage tank may also have the pressurized gas. In such embodiments, the energy storage and retrieval system may further comprise a first conduit (e.g., one or more pipes or tubes) fluidly connecting the pressurized gas in the first low-temperature energy storage tank and the pressurized gas in the high-temperature energy storage tank. The first conduit is generally configured to balance (e.g., partially or fully equalize) a first pressure in the high-temperature energy storage tank with a second pressure in the first low-temperature energy storage tank. In such further embodiments, the first conduit may pass through the gradient heat exchanger, and the pressurized gas in the first conduit may exchange heat with the first energy storage medium and/or the working fluid.

In various embodiments, the first pressure changing device(s) may comprise a first circulation pump configured to transport the energy storage medium from the low-temperature energy storage tank to the high-temperature energy storage tank when the energy storage and retrieval system is charging, and a second circulation pump configured to transport the energy storage medium from the high-temperature energy storage tank to the low-temperature energy storage tank when the energy storage and retrieval system is discharging. In such embodiments, the energy storage and retrieval system may further comprise a first three-way valve between (i) the first low-temperature energy storage tank and (ii) the first and second circulation pumps, and a second three-way valve between (iii) the first pump and second circulation pumps and (iv) the high-temperature energy storage tank. Alternatively, the first pressure changing device(s) may comprise a reversible propeller pump.

In other or further embodiments, the second pressure changing device(s) may comprise a first pump configured to transport the working fluid from the substantially isothermal heat exchanger to the gradient heat exchanger when the energy storage and retrieval system is discharging, and a first turbine between the gradient heat exchanger and the substantially isothermal heat exchanger, driven by the working fluid when the energy storage and retrieval system is charging. Alternatively or additionally, the energy storage and retrieval system may further comprise another (e.g., a second) pump between the first low-temperature energy storage tank and the substantially isothermal heat exchanger, configured to move the first energy storage medium through the substantially isothermal heat exchanger when the energy storage and retrieval system is charging and when the energy storage and retrieval system is discharging.

In still other or further embodiments, the energy storage and retrieval system may further comprise a second low-temperature energy storage tank configured to store the second energy storage medium, and a still further (e.g., a third) pump configured to move the second energy storage medium through the substantially isothermal heat exchanger when the energy storage and retrieval system is charging discharging.

In one or more other or further embodiments, the energy storage and retrieval system may further comprise a still further (e.g., a third) pump between the first low-temperature energy storage tank and the substantially isothermal heat exchanger, configured to move the first energy storage medium through the substantially isothermal heat exchanger when the energy storage and retrieval system is charging or discharging. Alternatively, the energy storage and retrieval system may further comprise a second low-temperature energy storage tank, configured to store the second energy storage medium, in which case the third pump moves the second energy storage medium through the substantially isothermal heat exchanger when the energy storage and retrieval system is charging and when the energy storage and retrieval system is discharging.

Another aspect of the invention relates to an energy storage and retrieval system, comprising a first low-temperature energy storage tank storing an energy storage medium at a first temperature, a high-temperature energy storage tank storing the energy storage medium at a second temperature higher than the first temperature, one or more first pressure changing devices configured to transport the energy storage medium between the first low-temperature energy storage tank and the high-temperature energy storage tank, a gradient heat exchanger through which the energy storage medium passes, configured to exchange heat between the first energy storage medium and a working fluid over a temperature range, a substantially isothermal heat exchanger containing the energy storage medium or through which the energy storage medium passes, configured to exchange heat at a substantially constant temperature between the working fluid and the energy storage medium, a compressor/expander in fluid communication with the gradient heat exchanger and the substantially isothermal heat exchanger, configured to change a pressure of the working fluid between the gradient heat exchanger and the substantially isothermal heat exchanger, and one or more second pressure changing devices between and in fluid communication with the gradient heat exchanger and the substantially isothermal heat exchanger, configured to transport the working fluid from the substantially isothermal heat exchanger to the gradient heat exchanger when the energy storage and retrieval system is discharging and from the gradient heat exchanger to the substantially isothermal heat exchanger when the energy storage and retrieval system is charging. Similar to the previous aspect, the energy storage medium may comprise water. In some embodiments, the energy storage medium may comprise a man-made or natural body of water.

In other or further embodiments, the first pressure changing device(s) may comprise a first pump configured to transport the energy storage medium from the low-temperature energy storage tank to the high-temperature energy storage tank when the energy storage and retrieval system is charging, and a first turbine between the gradient heat exchanger and the low-temperature energy storage tank, driven by the energy storage medium when the energy storage and retrieval system is discharging. Alternatively or additionally, the second pressure changing device(s) may comprise a second pump configured to transport the working fluid from the substantially isothermal heat exchanger to the gradient heat exchanger when the energy storage and retrieval system is discharging, and a second turbine between the gradient heat exchanger and the first low-temperature energy storage tank, driven by the working fluid when the energy storage and retrieval system is charging. In some implementations, the second turbine provides power to the first pump when the energy storage and retrieval system is charging, and the first turbine provides power to the second pump when the energy storage and retrieval system is discharging.

An even further aspect of the invention relates to a method of storing energy, comprising storing an energy storage medium at a first temperature in one or more low-temperature energy storage tanks; passing the energy storage medium through a gradient heat exchanger; compressing a working fluid (e.g., in a trilateral cycle); passing the compressed working fluid through the gradient heat exchanger; rejecting heat from the compressed working fluid to the energy storage medium over a temperature range (e.g., between the first temperature and a second temperature higher than the first temperature) in the gradient heat exchanger, thereby heating the energy storage medium and cooling the compressed working fluid; storing the heated energy storage medium in a high-temperature energy storage tank (e.g., at the second temperature); optionally driving a turbine with the cooled, compressed working fluid; and exchanging heat between the working fluid and either the energy storage medium or a different energy storage medium at a substantially constant temperature, thereby changing a phase of the working fluid.

In some embodiments of this method, a pressure in the high-temperature energy storage tank is balanced with a pressure in the low-temperature energy storage tank that is in fluid communication with the high-temperature energy storage tank using a pressurized gas in each of the low-temperature and high-temperature energy storage tanks and a conduit in fluid communication with each of the low-temperature and high-temperature energy storage tanks, and/or heat is exchanged between the working fluid and the energy storage medium at the substantially constant temperature. In other or further embodiments of this method, exchanging heat between the working fluid and the energy storage medium comprises pumping the energy storage medium through an isothermal heat exchanger, either from or to a first one of the one or more low-temperature energy storage tanks. Alternatively or additionally, passing the energy storage medium through a gradient heat exchanger comprises pumping the energy storage medium through the gradient heat exchanger from the first one or a second one of the one or more low-temperature energy storage tanks. Other aspects of the method of storing energy may comprise or concern operations or functions of the system described above or elsewhere herein.

A still further aspect of the invention relates to a method of retrieving energy, comprising storing a first energy storage medium in a high-temperature energy storage tank at a first (e.g., relatively high) temperature; passing the first energy storage medium through a gradient heat exchanger; passing a working fluid (e.g., in a trilateral cycle) through the gradient heat exchanger; rejecting heat from the first energy storage medium to the working fluid in the gradient heat exchanger over a temperature range (e.g., between the first temperature and a second temperature lower than the first temperature), thereby heating the working fluid and cooling the first energy storage medium; storing the cooled first energy storage medium in a low-temperature energy storage tank; expanding the heated working fluid (e.g., in the trilateral cycle); and exchanging heat between the expanded working fluid and either the cooled first energy storage medium from the low-temperature energy storage tank or a second energy storage medium at a substantially constant temperature, thereby changing a phase of the expanded working fluid. In some embodiments of this method, the pressure in the high-temperature energy storage tank is balanced with the pressure in the low-temperature energy storage tank in fluid communication with the high-temperature energy storage tank using the pressurized gas and the conduit (similar to the method in the preceding paragraph), and/or heat is exchanged between the expanded working fluid and the cooled first energy storage medium at the substantially constant temperature. Other or further aspects of the method may further comprise driving a turbine with the cooled, first energy storage medium prior to storing the cooled first energy storage medium in the low-temperature energy storage tank.

The present system and method can use water as a working fluid and/or as a storage medium. Water is inexpensive, plentiful, and environmentally friendly. Water is an advantageous heat storage medium due to its relatively large heat capacity (e.g., in comparison with other materials that are in a liquid phase at ambient temperatures).

The tanks for the storage medium may be relatively simple and inexpensive, because the heat storage medium may be stored and used at a relatively low temperature and at moderate pressure. The system may include as few as two storage tanks, yet remain independent of the environment. The energy storage system does not require large fans, which means that it can be located close to buildings in cities, for example. Prior systems may include four tanks, or at least two tanks plus the surrounding environment as a heat sink or heat source.

Other advantages of the present invention will become readily apparent from the detailed description of various embodiments below.

BRIEF DESCRIPTION OF THE DRAWINGS

FIG. 1B).

DETAILED DESCRIPTION

Reference will now be made in detail to one or more embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, "part," "portion," and "region" may be used interchangeably herein, but are generally given their art-recognized meanings. Wherever one such term is used, it also encompasses the other terms. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The term "ambient temperature," which may also be known as room temperature, refers to a temperature typically in the range of 15-30° C. (e.g., 18-25° C., or any temperature or range of temperatures therein).

Figure 2:
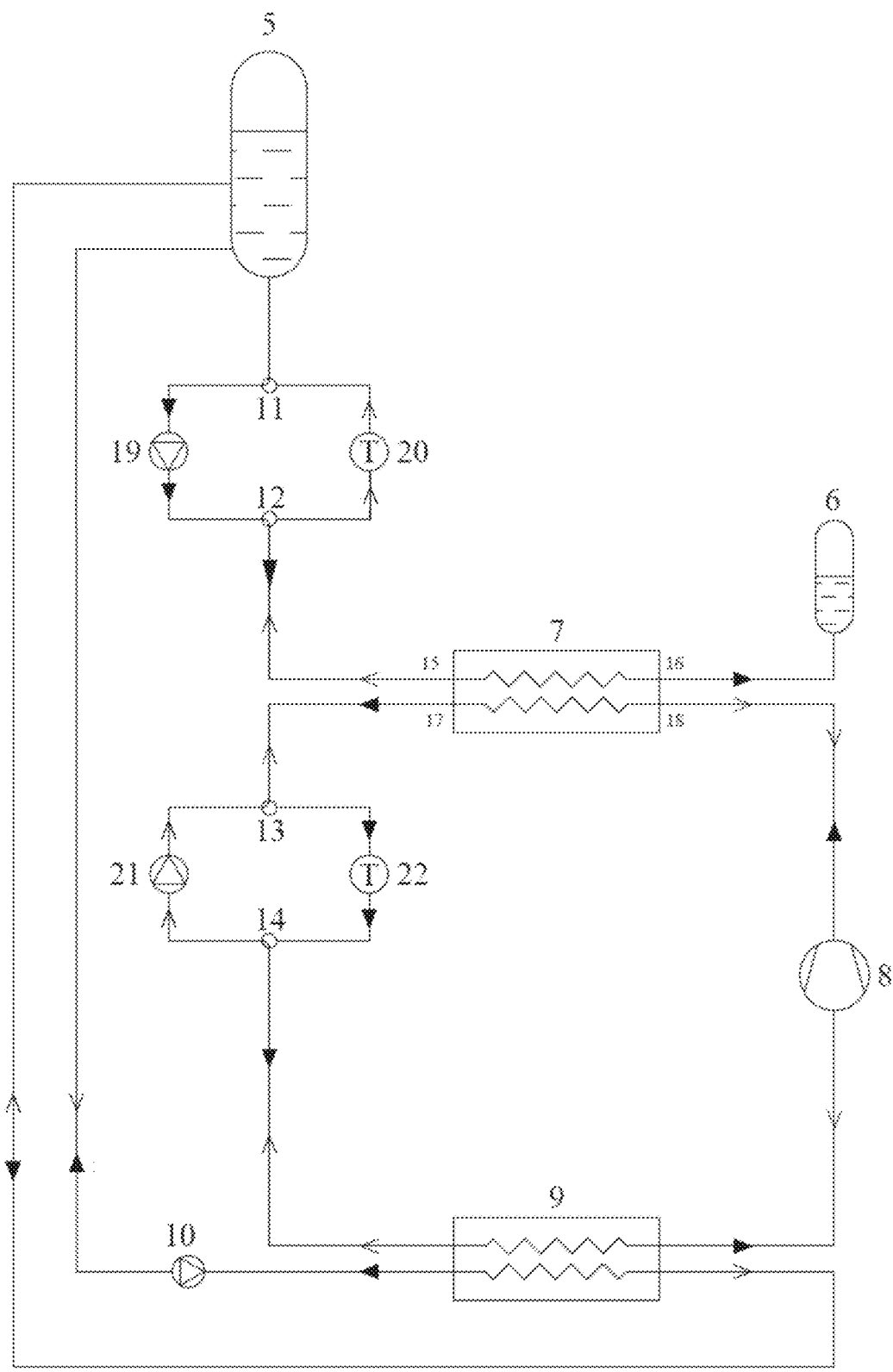
FIG. 2 is a schematic diagram of an exemplary system in accordance with the present invention, including a trilateral expansion-heat exchange-compression-heat exchange cycle, a thermal energy storage subsystem including a low-temperature storage tank and a high-temperature storage tank, and a low-temperature/isothermal heat sink/heat source subsystem for the isothermal part of the trilateral cycle.

In part, the present invention concerns a method and system for thermal energy storage and retrieval. FIG. 2 shows an exemplary system. The system includes a high-temperature energy storage tank 6. The tank 6 may store water as the energy storage medium at a relatively high temperature (e.g., 65-300° C., or any temperature or range of temperatures therein, such as 200° C.) and at a first pressure (e.g., 2-40 bar, or any pressure or range of pressures therein, such as 16 bar). The water may be stored in a low-temperature energy storage tank 5 at a relatively low temperature (e.g., 0-60° C., or any temperature or range of temperatures therein).

Figure 1A:
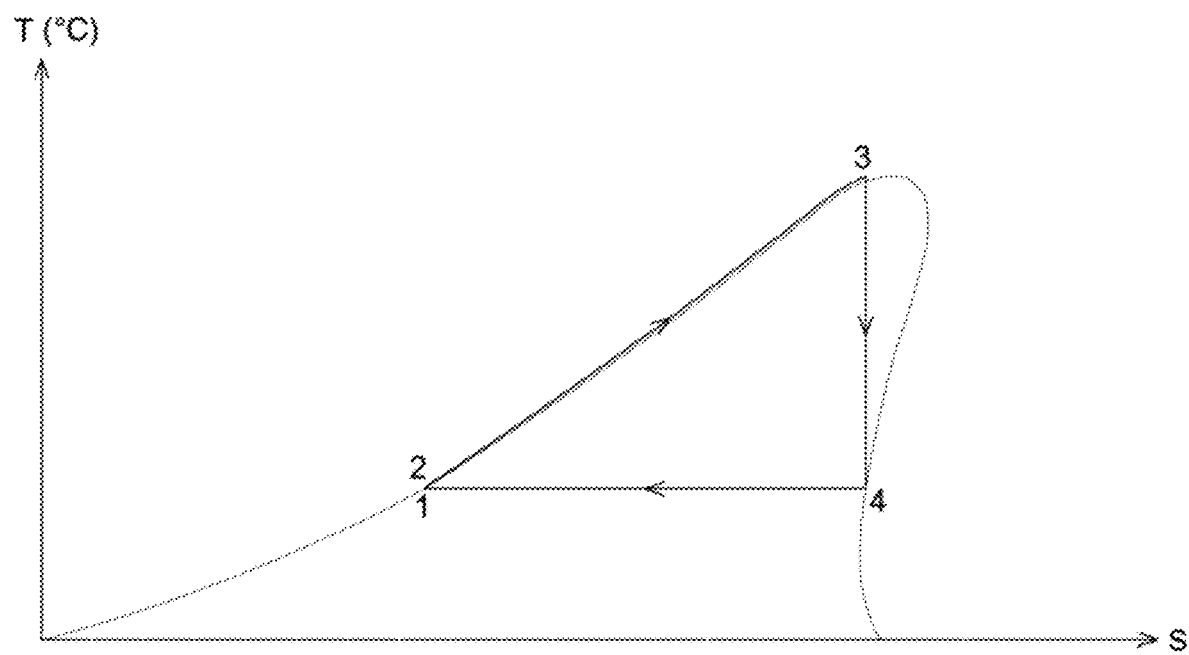
FIGS. 1A-B are temperature-entropy (TS) diagrams showing a conventional trilateral cycle (FIG. 1A) and specific trilateral cycles for dimethyl ether (DME.
Figure 1B:
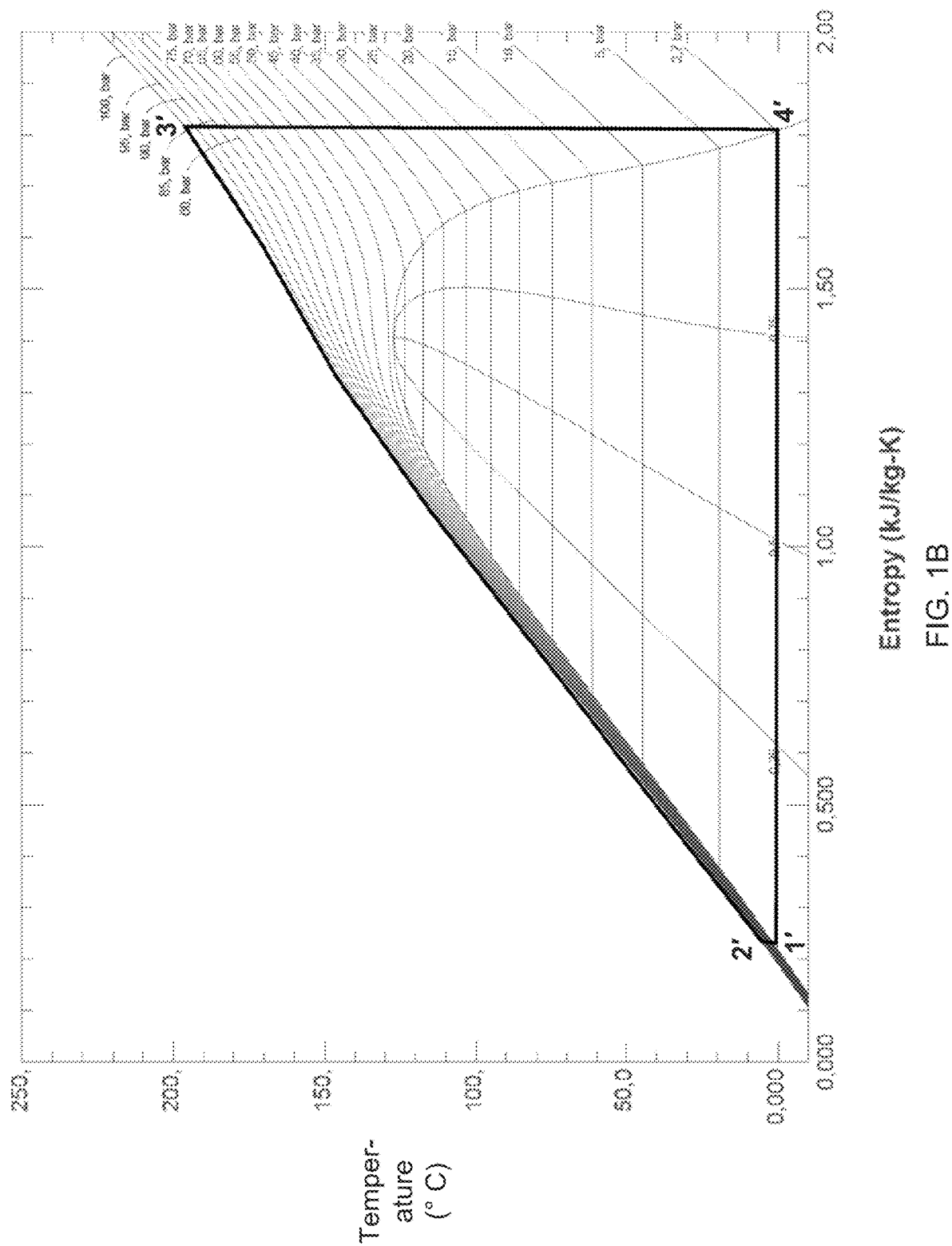

The expansion-heat exchange-compression-heat exchange cycle Aug. 18, 2017-22-8 (charging) and Aug. 9, 2021-17-18 (discharging) may use pentane(s) (i.e., n-pentane or a mixture of pentane isomers) as the working fluid, although other fluids, such as hexane(s), butane, propane, cyclopentane, acetone, cyclopentane, isopentane, undecane, HFO-1336mzz-Z, R123 (which is suitable, its potential phase-out in commercial use notwithstanding), R1233zd, or similar materials, may also be suitable. This cycle is implemented as a trilateral cycle, as shown in FIG. 1.

In the trilateral cycle, a gradient heat exchanger 7 (FIG. 2) exchanges heat between the working fluid and the energy storage medium. There may be a relatively large difference between the temperature of the working fluid entering the heat exchanger 7 and exiting the heat exchanger 7, corresponding to the slope 2-3 in the entropy diagram in FIG. 1. There may also be a relatively large difference (e.g., 100-250° C., or any temperature or range of temperatures therein, such as 150-200° C.) in the temperature of the energy storage medium after it passes through the heat exchanger 7.

When the system is charging, the energy storage medium is pumped by the pump 19 from the low-temperature energy storage tank 5, through the heat exchanger 7 from a first port 15 to a second port 16, to the high-temperature energy storage tank 6, and the working fluid (which may be at a relatively high pressure due to compression by the compressor 8) passes through the heat exchanger 7 from a third port 18 to a fourth port 17. When the system is discharging, the energy storage medium flows from the high-temperature energy storage tank 6, through the heat exchanger 7 from the second port 16 to the first port 15, through a turbine 20, to the low-temperature energy storage tank 5, and the working fluid is pumped by a pump 21 through the heat exchanger 7 from the fourth port 17 to the third port 18. The turbine 20 drives the generation of electricity or other form of usable energy (e.g., mechanical energy). Three-way valves 11 and 12 control the flow of the energy storage medium through the pump 19 and the turbine 20, and three-way valves 13 and 14 control the flow of the working fluid through the pump 21 and a second turbine 22 in the trilateral cycle.

A traditional heat exchanger 9 exchanges heat between the working fluid and the energy storage medium in the low-temperature energy storage tank 5. There may be a relatively small difference (e.g., about 0° C.) between the temperature of the working fluid entering the heat exchanger 9 and exiting the heat exchanger 9, corresponding to the horizontal (isothermal) part 4-1 of the trilateral cycle in the entropy diagram of FIG. 1. Optionally, there may also be a relatively small difference (e.g., 1-50° C., or any temperature or range of temperatures therein, such as 1-20° C.) in the temperature of the energy storage medium after it passes through the heat exchanger 9.

When the system is charging, part of the energy storage medium is pulled through the heat exchanger 9 by a two-way pump 10. The working fluid passes through the heat exchanger 9 from the second turbine 22 to the compressor 8. The second turbine 22 may also drive the generation of electricity or other form of usable energy (e.g., mechanical energy). Alternatively, the second turbine 22 may drive one or more of the pumps 10, 19 and 21. When the system is discharging, the two-way pump 10 moves some of the energy storage medium from the low-temperature energy storage tank 5 through the heat exchanger 9, while the working fluid passes through the heat exchanger 9 from the expander 8 (i.e., the reverse function/operation of the compressor 8) to the pump 21. Thus, the horizontal (isothermal) part 4-1 of the entropy diagram in FIG. 1 moves upwards during the discharge cycle and/or operation, a novel feature of the present system and method.

Figure 3:
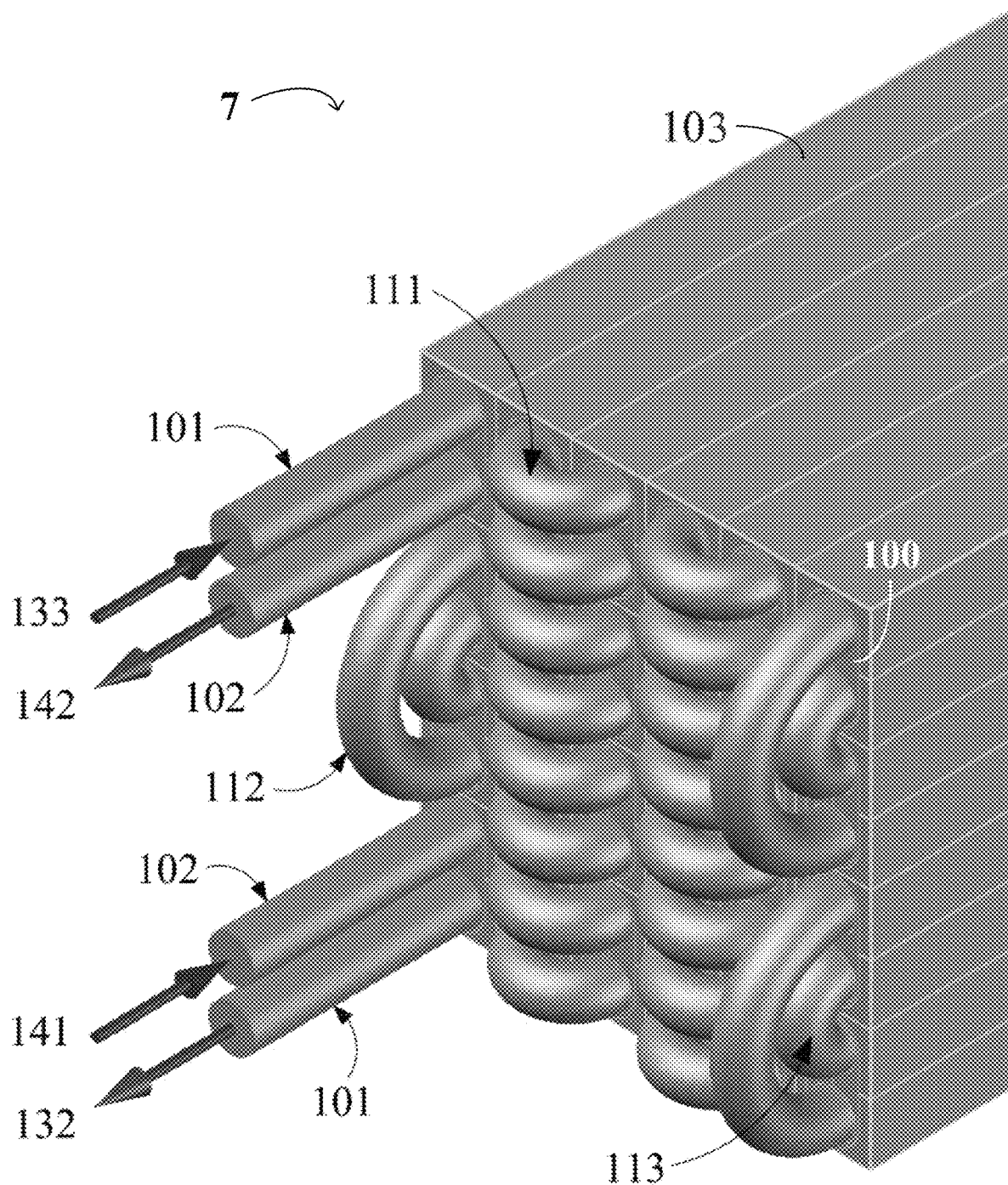
FIG. 3 shows an end of an exemplary gradient heat exchanger that includes straight heat conducting and heat isolating elements in accordance with one or more embodiments of the present invention.

The gradient heat exchanger 7 may comprise a heat exchanger exemplified in FIG. 3. The heat exchanger 7 includes straight heat conducting (e.g., heat exchanging) and heat isolating elements 100. Tubes or pipes 101 and 102 transport the energy storage medium (e.g., 133) and a counter-flowing working fluid (e.g., 142), and pass through a plurality of straight heat transfer elements 100 made from two identical, mirrored and/or complementary sections (see, e.g., FIG. 4). Each straight heat transfer element 100 is surrounded (and thus thermally isolated) by a straight heat-isolating element 103 made from two identical (and preferably self-locking) sections. U-shaped tubes 111, 112 and 113 transport the energy storage medium and the working fluid from one heat exchanger section to the next heat exchanger section. The U-shaped tubes 111, 112 and 113 may be thermally insulated (and optionally thermally isolated from each other) to prevent heat exchange with the external environment.

Figure 4:
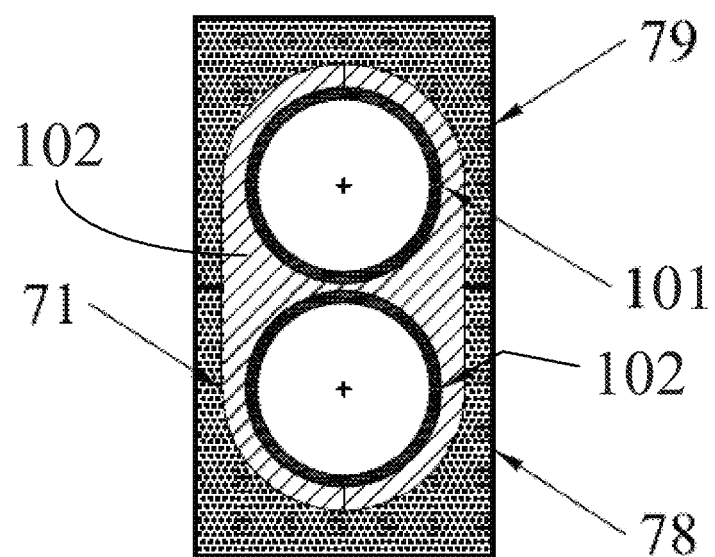
FIG. 4 shows a cross-sectional view of a straight heat conducting and heat isolating element in the exemplary heat exchanger of FIG. 3.

FIG. 4 shows a cross-sectional view of a straight heat conducting and heat isolating element in the exemplary heat exchanger of FIG. 3. FIG. 4 shows tubes or pipes 101 and 102, a one-piece heat transfer unit or element 71 (corresponding to heat transfer elements 100 in FIG. 3), and (self-locking) sections 78 and 79 that make up the heat-isolating element 103 in FIG. 3. The heat transfer unit or element 71 (FIG. 4) may comprise a thermally conductive material 103 having an H-shaped cross-sectional profile (see FIG. 7A), with two or four relatively planar sheets of material extending from the middle, and two semi-circular or semi-cylindrical surfaces in the middle, facing in opposed directions. The tubes or pipes 101 and 102 have a diameter configured to fit in the semi-circular surfaces of the heat transfer unit or element 71. Although tubes or pipes 101 and 102 having a circular cross-section and a heat transfer unit or element 71 having two surfaces with a semi-circular cross-section are shown, the invention is not limited to such a configuration, and other cross-sectional profiles or shapes given herein are possible, as long as the heat transfer unit or element 71 has inner surfaces matching the external surfaces of the tubes or pipes 101 and 102 that face one another in the heat transfer elements 100. The sections 78 and 79 generally comprise a thermally non-conductive (insulative) material.

Figure 5C:
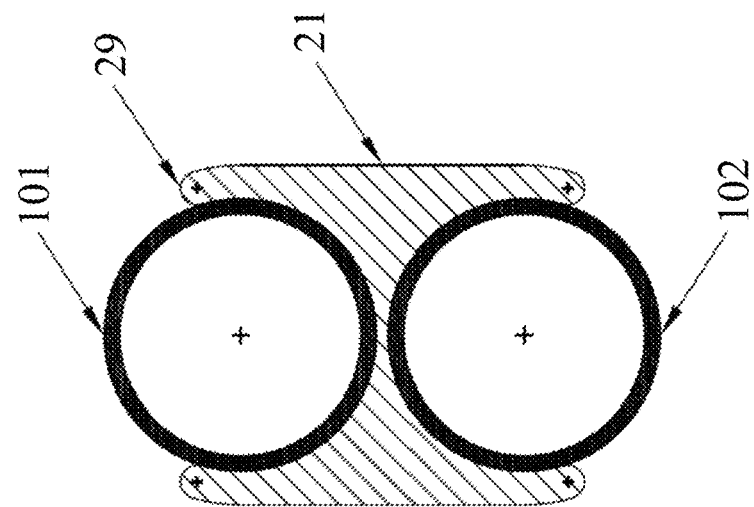
FIGS. 5A-C show cross-sectional views of a section or level of alternative exemplary heat exchangers in accordance with embodiments of the present invention.
Figure 5B:
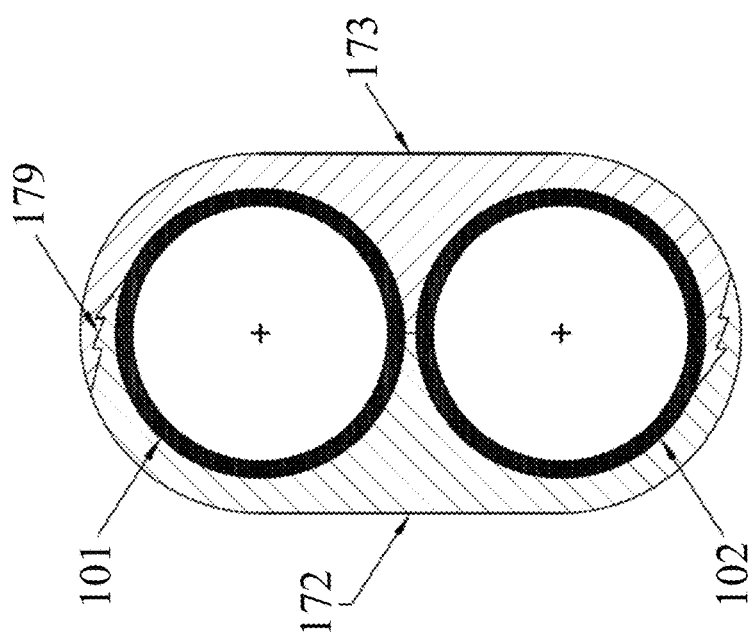
Figure 5A:
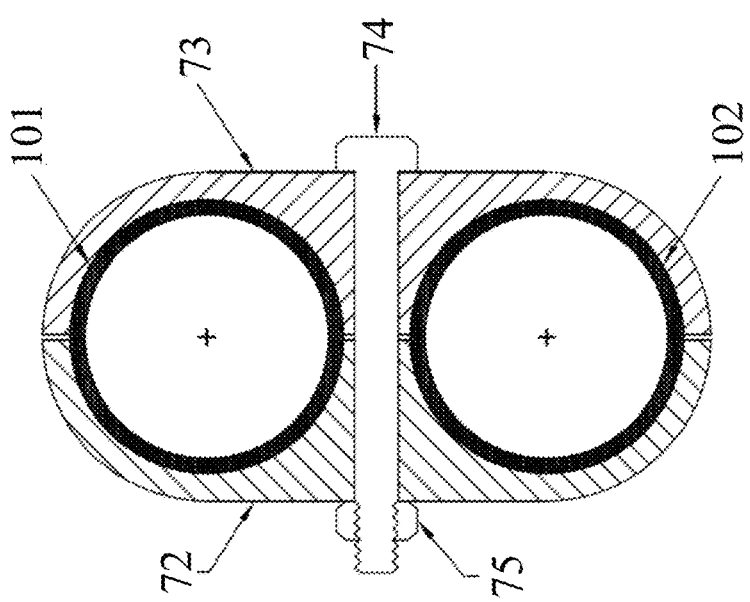

Alternative embodiments of the heat conducting and heat isolating element of FIG. 4 are shown in FIGS. 5A-C. For example, FIG. 5A shows a cross-sectional view of a section or level of an alternative heat exchanger, comprising the tubes or pipes 101/102 passing through a heat transfer element 72-73. The heat transfer element 72-73 may comprise or consist of a heat conducting material that transfers heat between the tubes or pipes 101 and 102. The tubes or pipes 101 and 102 and the heat transfer element 72-73 may comprise or consist of the same or different materials. The tubes or pipes 101 and 102 as shown have a circular cross-section, but the tubes or pipes 101 and 102 can have any cross-sectional shape that allows for heat exchange (e.g., oval, square, rectangular, half-circle, half-oval, etc.). The tubes or pipes 101 and 102 (or sections thereof) can comprise a single material (in which case each tube or pipe 101 or 102 can comprise the same material) or two or more different materials, depending on heat conduction requirements and/or a desired corrosion resistance. Such materials may include plastics (e.g., polyvinyl chloride [PVC], polyethylene [which may be cross-linked], polypropylene, polybutylene, acrylonitrile-butadiene-styrene [ABS], etc., any of which may be fiber-reinforced), metals (e.g., steel, aluminum, copper, iron, brass), glass, fiberglass, ceramics (e.g., concrete), etc. The tubes or pipes 101 and 102 may be inserted in the heat transferring element. The external surface of the tubes or pipes 101 and 102 and the internal surface of the heat transfer element are either in firm contact or a heat conducting material such as a heat conducting paste, glue or solder is between them, transferring heat between the surfaces. The firm contact is provided by the first securing mechanism.

The heat transfer element of FIG. 5A includes two heat transfer elements 72 and 73, bolted together with a bolt 74 and a securing element (e.g., a nut) 75. Each of the heat transfer elements 72 and 73 has a pair of semi-cylindrical troughs or depressions having a width substantially equal to the diameter of the tubes or pipes 101 and 102. The heat transfer elements 72 and 73 may comprise a material such as metal or a metal alloy that can be extruded or diecast, or a thermoplastic material that can be extruded or molded (e.g., by injection molding). The tubes or pipes 101 and 102 may have different diameters, in which case the heat transfer elements 72 and 73 are not identical. There is a wide variety of heat transfer materials and/or compounds available in the market having a variety of capabilities and/or rates of heat transfer (e.g., between the tubes 101 and 102, through the extruded or diecast profile of the heat transfer elements 72 and 73). In one example, the heat transfer elements 72 and 73 comprise a thermally conductive metal or metal alloy in the portion between the tubes or pipes 101 and 102. A compressible gasket or other fitting may line the troughs or depressions in the heat transfer elements 72 and 73, and the gasket or fitting may be made of a thermally conductive material. A thermally conductive paste may be applied between the tubes and the heat transfer elements to increase the heat transfer and to allow the different parts to move (e.g., due to thermal expansion). Additionally or alternatively, a washer or spring may be present between the tubes and the heat transfer elements to absorb any thermal expansion of the tubes and/or heat transfer elements.

FIG. 5B shows a cross-sectional view of a section or level of a further alternative heat exchanger. The alternative heat exchanger comprises two identical self-locking, snap-on heat transfer elements 171 and 172, secured to each other by complementary and/or mating, grooved and/or ridged locking mechanisms 179. In such an embodiment, the heat exchanger is straight or linear (e.g., it has an axis or plane of symmetry along its center). Otherwise, the heat exchanger of FIG. 2 is similar or substantially the same as the heat exchanger of FIG. 5A.

FIG. 5C shows a cross-sectional view of a section or level of a further alternative heat exchanger. The heat exchanger of FIG. 5C comprises a single heat transfer unit or element 21 having side walls that curve slightly inwards at the outermost edges or lips 29, configured to secure or self-lock the two tubes 101 and 102 therein. Thus, the diameter of the tubes or pipes 101 and 102 is slightly greater than the distance between the outermost edges or lips 29 of the side walls. The heat exchanger of FIG. 5C can be surrounded by a thermal insulator (e.g., similar to sections 78 and 79 in FIG. 4), in which case the thermal insulator functions as a thermal isolator between sections and/or layers of the heat exchanger (see, e.g., FIG. 3) and to the surroundings.

Figure 6:
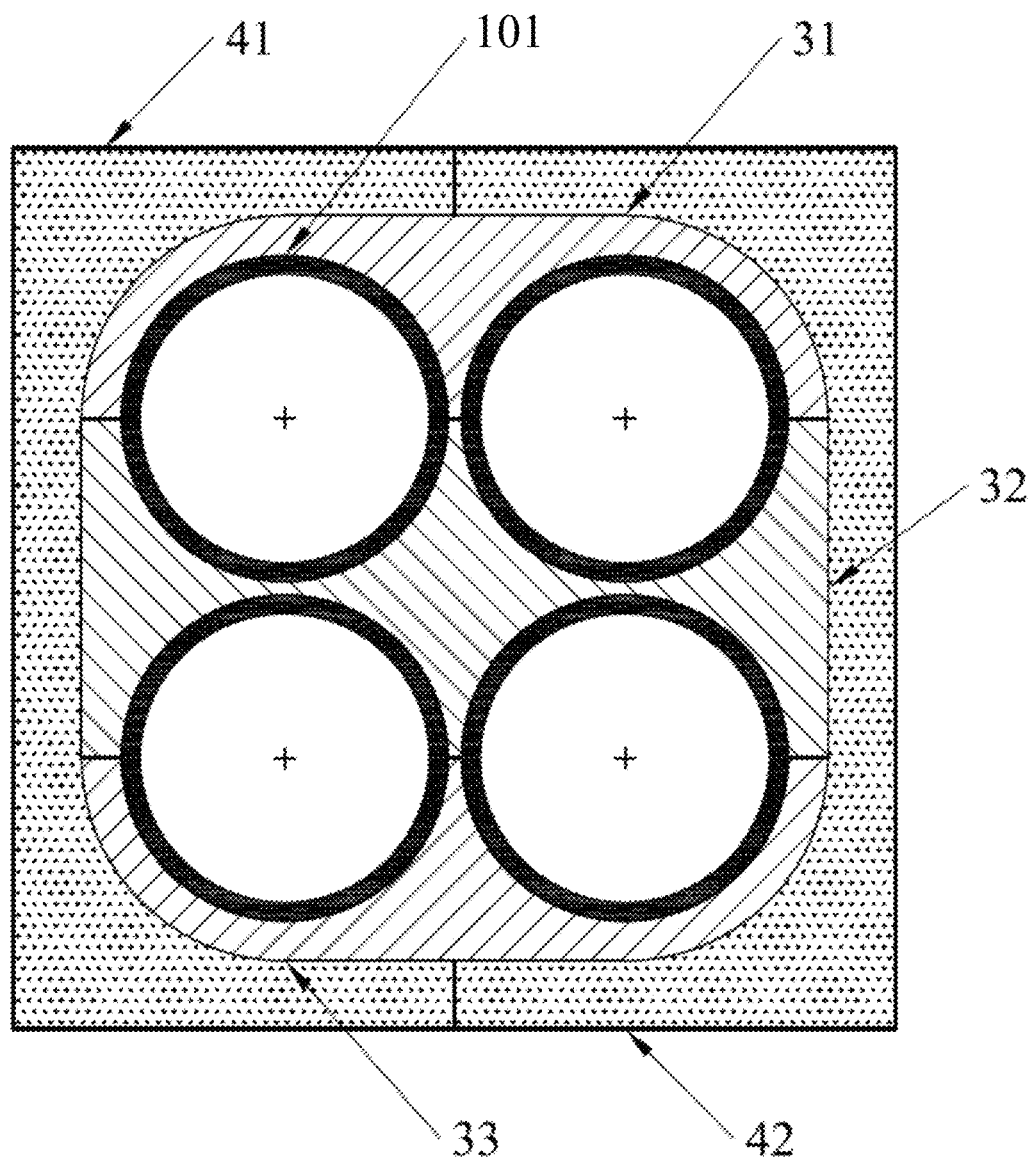
FIG. 6 shows a cross-sectional view of a section or level of another exemplary heat exchanger in accordance with one or more embodiments of the present invention.

FIG. 6 shows a cross-sectional view of a section or level of another exemplary heat exchanger. The heat exchanger of FIG. 6 includes a 5-piece heat transfer unit or element through which four tubes or pipes 101 pass. The 5-piece heat transfer unit or element includes three heat-conducting elements 31, 32 and 33, and two isolator sections 41 and 42. The two isolator sections 41 and 42 may self-lock in the same manner as that shown in FIG. 4 or by another known self-locking mechanism, they may be bolted together as shown in FIG. 5A, or they may be held together or otherwise secured to each other by known means (e.g., a tightened band or strap around the outer periphery of the isolator sections 41 and 42, etc.). The heat conducting elements 31, 32 and 33 may be held in place with each other using known mechanisms (e.g., tongue-in-groove fittings, mating projection-and-hole, projection-and-opening or projection-and-depression fittings, etc., with or without an applied adhesive). Such mechanisms may also be used to secure the two isolator sections 41 and 42 to each other.

Figure 7C:
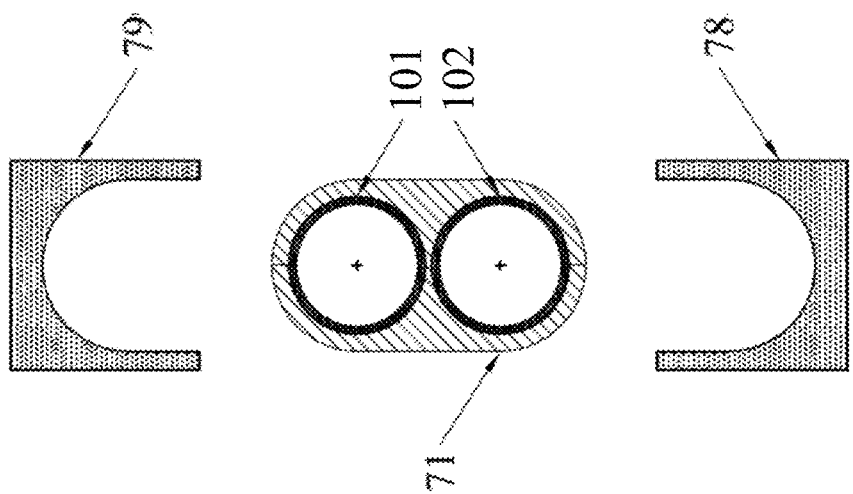
FIGS. 7A-C show cross-sectional views of one or more exemplary heat exchangers in various stages of an exemplary method of making the exemplary heat exchanger(s) in accordance with one or more embodiments of the present invention.
Figure 7B:
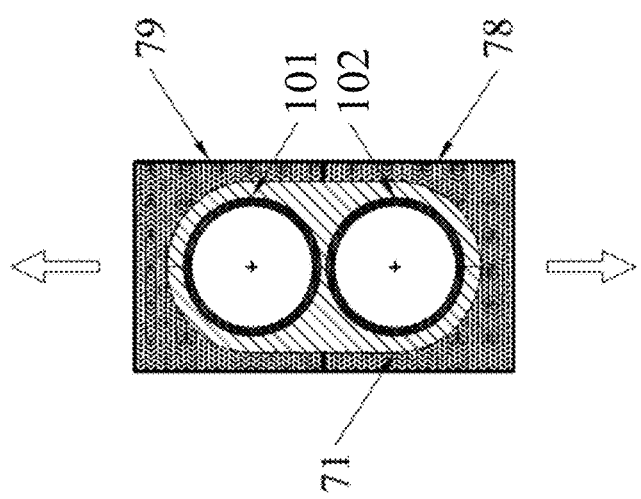
Figure 7A:
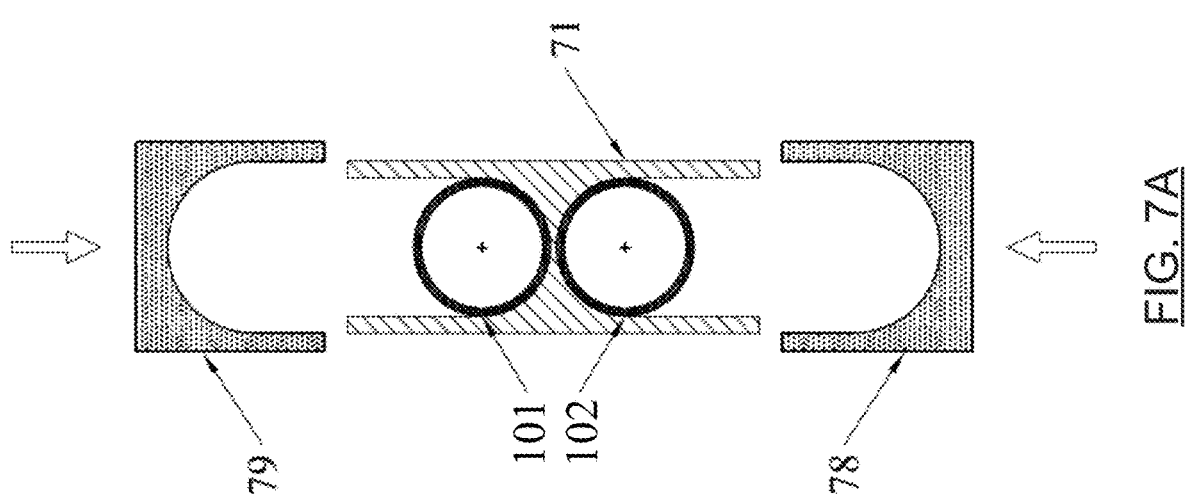

FIGS. 7A-C show cross-sectional views of a section or level of one or more exemplary heat exchangers during an exemplary method for making the heat exchanger(s). FIG. 7A shows two tubes or pipes 101 and 102, a one-piece heat transfer unit or element 71, and pressing tool sections or halves 78 and 79, substantially as depicted in FIG. 4. The heat transfer unit or element 71 has an H-profile, with two or four relatively planar sheets of material extending from the middle, and two semi-circular surfaces in the middle, facing in opposed directions. The tubes or pipes 101 and 102 have a diameter configured to fit in the semi-circular surfaces of the heat transfer unit or element 71. Although tubes or pipes 101 and 102 having a circular cross-section and a heat transfer unit or element 71 having two surfaces with a semi-circular cross-section are shown, the invention is not limited to such a configuration, and other cross-sectional profiles or shapes given herein are possible, as long as the heat transfer unit or element 71 has inner surfaces matching the surfaces of the tubes or pipes 101 and 102 that face one another (i.e., the inner surfaces of the tubes or pipes 101 and 102). The pressing tool sections 78 and 79 also have a cross-sectional profile matching that of the outer surfaces of the tubes or pipes 101 and 102, but larger by about the thickness of the sheets of material extending from the middle of the heat transfer unit or element 71.

In FIG. 7B, the pressing tool sections 78 and 79 are brought together, thereby bending the sheets of material extending from the middle of the heat transfer unit or element 71 around the outer surfaces of the tubes or pipes 101 and 102. As shown by the arrows in FIG. 7B, the pressing tool sections 78 and 79 are removed (see FIG. 7C), in which case the pressing tool sections 78 and 79 function as sections of a mold for forming the heat exchanger. The sheets of material extending from the middle of the heat transfer unit or element 71 may be held in place with a thermally-conductive adhesive applied to the inner surface of the material (e.g., after placing the tubes or pipes 101 and 102 against the inner surfaces of the heat transfer unit or element 71), and/or the ends of the sheets of material extending from the middle of the heat transfer unit or element 71 may be fastened or secured to each other by an interlocking mechanism as shown in FIG. 5B, or using a known mechanism (e.g., as described herein).

When the hot storage tank 6 in FIG. 2 empties, the pressure in the high-temperature energy storage tank 6 drops, whereby the water boils, and some of the water evaporates (e.g., turns into steam). The heat of vaporization taken from the water when it evaporates is significant, and the lost heat of vaporization lowers the system's capacity.

Figure 8:
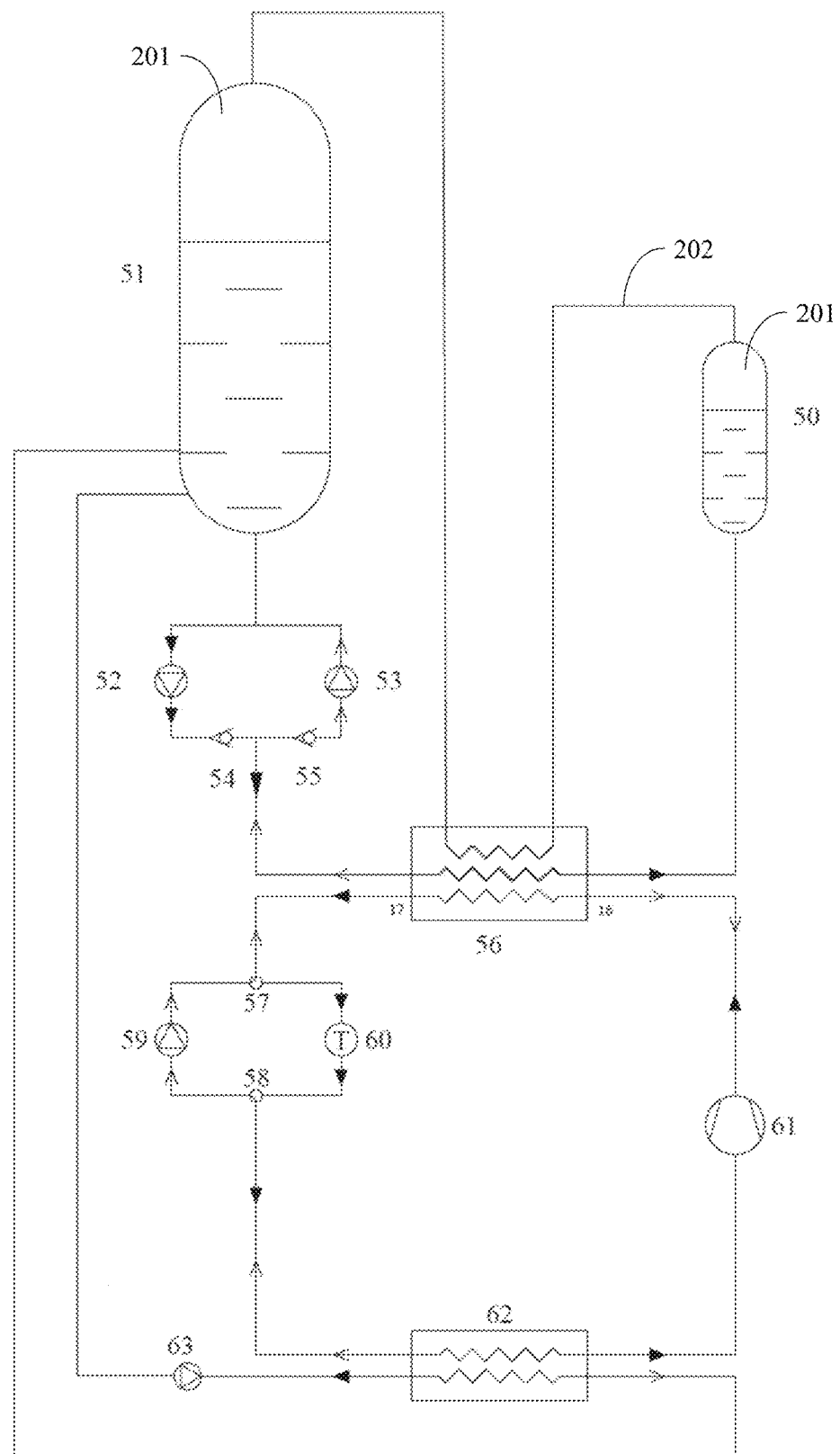
FIG. 8 shows an exemplary two-tank energy storage system pressurized with an inert gas, working in conjunction with an exemplary trilateral cycle similar or identical to that shown in FIG. 2.

Referring now to FIG. 8, in order to increase the useful heat capacity in the system, the low-temperature energy storage tank 51 and the high-temperature energy storage tank 50 are pressurized with a gas 201 therein. The upper parts of the low- and high-temperature energy storage tanks 51 and 50 are connected with a pipe 202. When the pressure decreases in the high-temperature energy storage tank 50 (e.g., when water is pumped or transferred from the high-temperature energy storage tank 50), the pressurized gas 201 flows from the low-temperature energy storage tank 51 to the high-temperature energy storage tank 50. Thus, in its simplest form, the pressure in the low-temperature energy storage tank 51 and the high-temperature energy storage tank 50 is substantially the same. As a result, the power consumed by the pump (e.g., 52 and/or 53) that pumps the water between the low-temperature energy storage tank 51 and the high-temperature energy storage tank 50 is much less than without the pressurized gas 201. For example, the pumps 52 and 53 may comprise low-pressure circulation pumps or other, similar pumps that only need to overcome frictional losses in the pipes or tubes between the low-temperature energy storage tank 51 and the high-temperature energy storage tank 50. Pumps 52 and 53, and optionally, check valves 54 and 55 can be replaced with a single reversible propeller pump. In a more specific embodiment, the reversible propeller pump includes a relatively precise variable speed control, to optimize its operation.

In various modifications, there may also be a pressure sensor (not shown) in the pipe 202 to monitor and/or measure the pressure of the gas 210, a valve through which additional pressurized gas can be added to (or excess pressurized gas can be removed from) the pipe 202 or the low-temperature energy storage tank 51 (e.g., for safety reasons), and/or one or more pressure-activated valves (e.g., between a tank 51 or 50 and the pipe 202) to control when the pressurized gas 201 is transferred from one of the tanks 51 and 50 to the other (e.g., when pressure differential on opposite sides of the valve exceeds a predetermined value, such as in the range of 1-10 atm). On the other hand, when the water flows from the low-temperature energy storage tank 51 to the high-temperature energy storage tank 50, the pressure decreases in the low-temperature energy storage tank 51, and the pressurized gas 201 flows from the high-temperature energy storage tank 50 to the low-temperature energy storage tank 51.

The expansion-heat exchange-compression-heat exchange cycle 61-16-17-57-60-58-62-61 (charging) and 61-62-58-59-57-17-16-61 (discharging) is essentially the same as the expansion-heat exchange-compression-heat exchange cycle in FIG. 2, except for the embodiment(s) that include a section of the pipe or tube 202 in the gradient heat exchanger 56. The working fluid in the expansion-heat exchange-compression-heat exchange cycle in FIG. 8 may be the same as that in the expansion-heat exchange-compression-heat exchange cycle in FIG. 2.

In the trilateral cycle of FIG. 8, there may be a relatively large difference between the temperature of the working fluid entering the heat exchanger 56 and exiting the heat exchanger 56, corresponding to the slope 2-3 in the entropy diagram in FIG. 1. There may also be a relatively large difference in the temperature of the energy storage medium after it passes through the heat exchanger 56.

When the system is charging, the energy storage medium is pumped by the pump 52 from the low-temperature energy storage tank 51, through the heat exchanger 56, to the high-temperature energy storage tank 50, and the working fluid in the trilateral cycle passes through the heat exchanger 56 from port 16 to port 17, a turbine 60, and an isothermal heat exchanger 62 to a two-way compressor/expander 61. The turbine 60 drives the generation of electricity or other form of usable energy (e.g., mechanical energy). When the system is discharging, the energy storage medium is pumped by a second pump 53 from the high-temperature energy storage tank 50 to the low-temperature energy storage tank 51, and the working fluid in the trilateral cycle is pumped by a third pump 59 through the heat exchanger 56 from the port 17 to the port 16. In this case, because the pressure in the low-temperature energy storage tank 51, and the high-temperature energy storage tank 50 is essentially the same, the pump 53 moves the energy storage medium from the high-temperature energy storage tank 50 to the low-temperature energy storage tank 51, as there is no excess pressure in the high-temperature energy storage tank 50 to drive fluid flow through the heat exchanger 56 and a turbine. Check valves 54 and 55 control the flow of the energy storage medium through the pumps 52 and 53, and three-way valves 57 and 58 control the flow of the working fluid through the pump 59 and the turbine 60 in the trilateral cycle.

The isothermal heat exchanger 62 exchanges heat between the working fluid and the energy storage medium in the low-temperature energy storage tank 51. There may be a relatively small difference (e.g., about 0° C.) between the temperature of the working fluid entering the heat exchanger 62 and exiting the heat exchanger 62, corresponding to the horizontal (isothermal) part 4-1 of the trilateral cycle in the entropy diagram of FIG. 1A. Optionally, there may also be a relatively small difference in the temperature of the energy storage medium after it passes through the heat exchanger 62.

When the system is charging, the energy storage medium is pulled through the heat exchanger 62 by a two-way pump 63. The working fluid passes through the heat exchanger 62 from the turbine 60 to the compressor 61. Alternatively or additionally, the turbine 60 may drive one or both of the pumps 52 and 63. When the system is discharging, the two-way pump 63 moves some of the energy storage medium from the low-temperature energy storage tank 51 through the heat exchanger 62, while the working fluid passes through the heat exchanger 62 from the expander 61 (i.e., the reverse function/operation of the compressor 61) to the pump 59. Thus, the horizontal (isothermal) part 4-1 of the entropy diagram in FIG. 1A moves upwards during the discharge cycle and/or operation (see also the horizontal lines at 0° C. or greater in the temperature vs. entropy plots in FIG. 1B).

The pressurized gas 201 can be air when the high-temperature energy storage tank 50 is galvanized or coated with a protective layer. When the high-temperature energy storage tank 50 is made of steel, the pressurized gas 201 may be an inert gas, such as nitrogen or argon, to prevent corrosion of the steel.

In one advantageous embodiment shown in FIG. 8, the pressurized gas 201 can be heated or cooled as the gas 201 flows between the low-temperature energy storage tank 51 and the high-temperature energy storage tank 50. The pressurized gas 201 can be heated or cooled with the working medium (i.e., the medium in the cycle 61-62-58-59-57-56-61 or 61-56-57-60-58-62-61) by passing the pressurized gas 201 through the heat exchanger 31. The heat exchanger 31 can comprise the gradient heat exchanger 7 in FIG. 2 with a section of the pipe 202 therein, or a separate heat exchanger with an additional heat sink/source.

When the high-temperature energy storage tank 50 is not full for a sufficiently long time, the pressurized gas 201 in the tank 50 is saturated with water vapor. However, that heat (e.g., of vaporization) is not lost because it is returned to the hot water in the tank 50 via the heat exchanger 31 during charging. Alternatively, to prevent water vapor from evaporating and mixing with the pressurized gas 201 in the high-temperature energy storage tank 50, the water surface can be covered with a floating body or a layer of a liquid that does not mix with the water and that has a lower density than water (e.g., silicone oil or, at the operating temperatures in the high-temperature energy storage tank 50, paraffin wax).

Figure 9:
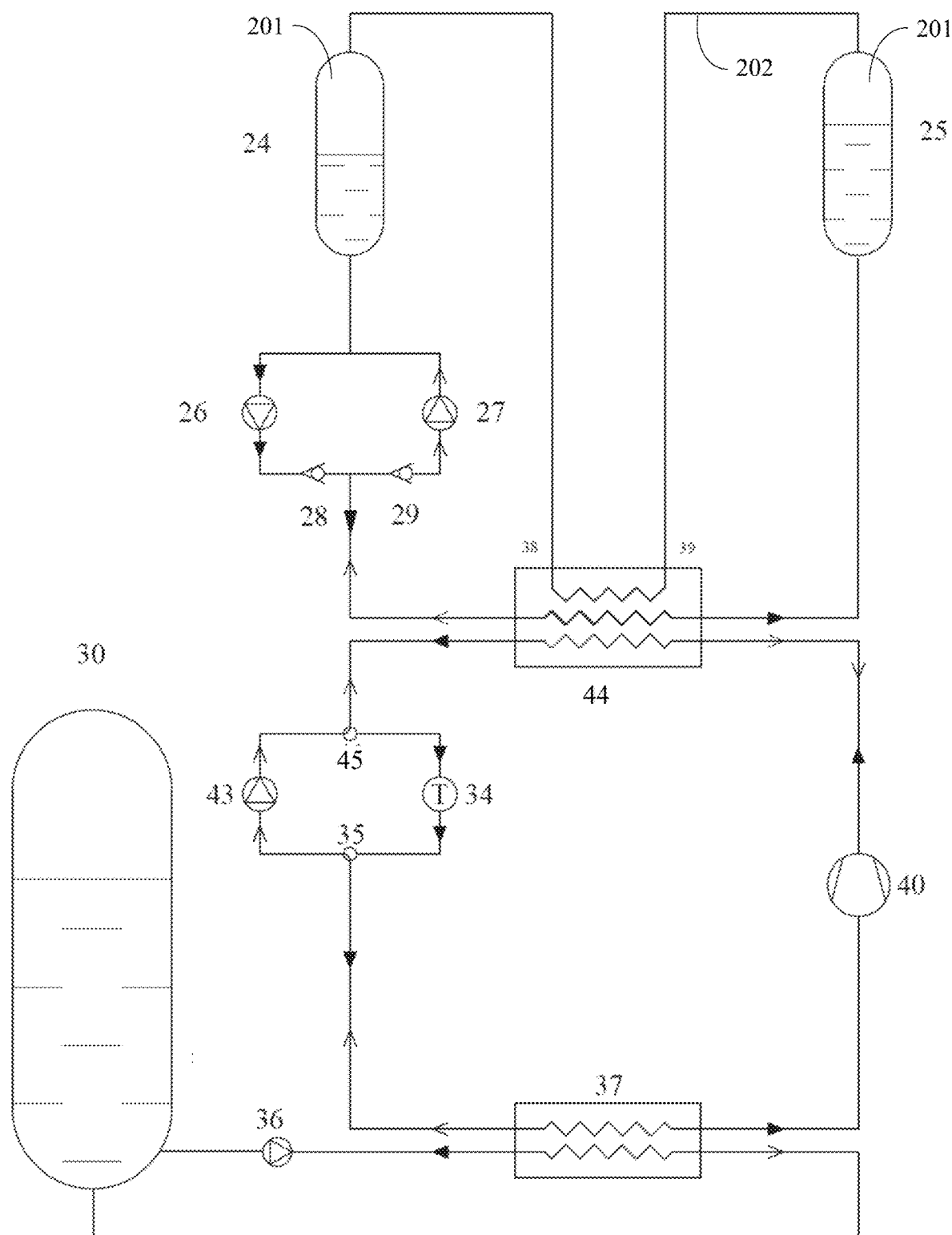
FIG. 9 shows an exemplary three-tank energy storage system including two tanks pressurized with an inert gas similar to the energy storage system shown in FIG. 8, and working in conjunction with an exemplary trilateral cycle similar or identical to that shown in FIG. 2.

FIG. 9 shows a three-tank energy storage system pressurized with preheated inert gas 211, driven by a trilateral cycle 40-44-45-34-35-37-40 (charging) or 40-37-35-43-42-45-44 (discharging), using a fluid other than water (e.g., pentane, DME) as the working fluid. The energy storage system is similar to that of FIG. 8, except that the low-temperature energy storage tank 51 in FIG. 8 is split into two low-temperature energy storage tanks 24 and 30. The low-temperature energy storage tank 24 stores the preheated inert gas 211 along with the high-temperature energy storage tank 25, and the low- and high-temperature energy storage tanks 24 and 25 operate together in substantially the same way as the low- and high-temperature energy storage tanks 50 and 51 in FIG. 8 and the low- and high-temperature energy storage tanks 5 and 6 in FIG. 2. However, a second low-temperature energy storage tank 30 stores water for use in isothermal heat exchanges in heat exchanger 37 with the trilateral cycle. In the heat exchanger 37, the water changes temperature, but the working fluid in the trilateral cycle changes phase (e.g., from gas to liquid, or from liquid to gas) without a substantial change in temperature (except perhaps at the entrance or exit of the heat exchanger 37).

The energy storage system and trilateral cycle of FIG. 9 operates substantially the same as that of FIG. 8, except that energy storage fluid in separate low-temperature energy storage tanks 24 and 30 exchange heat with the working fluid in the respective gradient and isothermal heat exchangers 44 and 37. This configuration allows for optimization of the quantities and, optionally, the temperatures of the water in the separate low-temperature energy storage tanks 24 and 30. The energy storage system and trilateral cycle of FIG. 9 also has the advantage that the storage tank 30 does not need to be pressurized (i.e., the energy storage medium therein can be stored at low pressure), which enables lower manufacturing costs (e.g., a relatively thin material for the storage tank 30) and use of a relatively low-pressure bidirectional pump 36 (e.g., a reversible propeller pump) to circulate the energy storage medium through the isothermal heat exchanger 37. On the other hand, the energy storage system and trilateral cycle of FIG. 8 has the advantage of having only two tanks for the entire system. The energy storage system and trilateral cycle of FIG. 2 can also use separate low-temperature energy storage tanks, similar to tanks 24 and 30 in FIG. 9.

Figure 10:
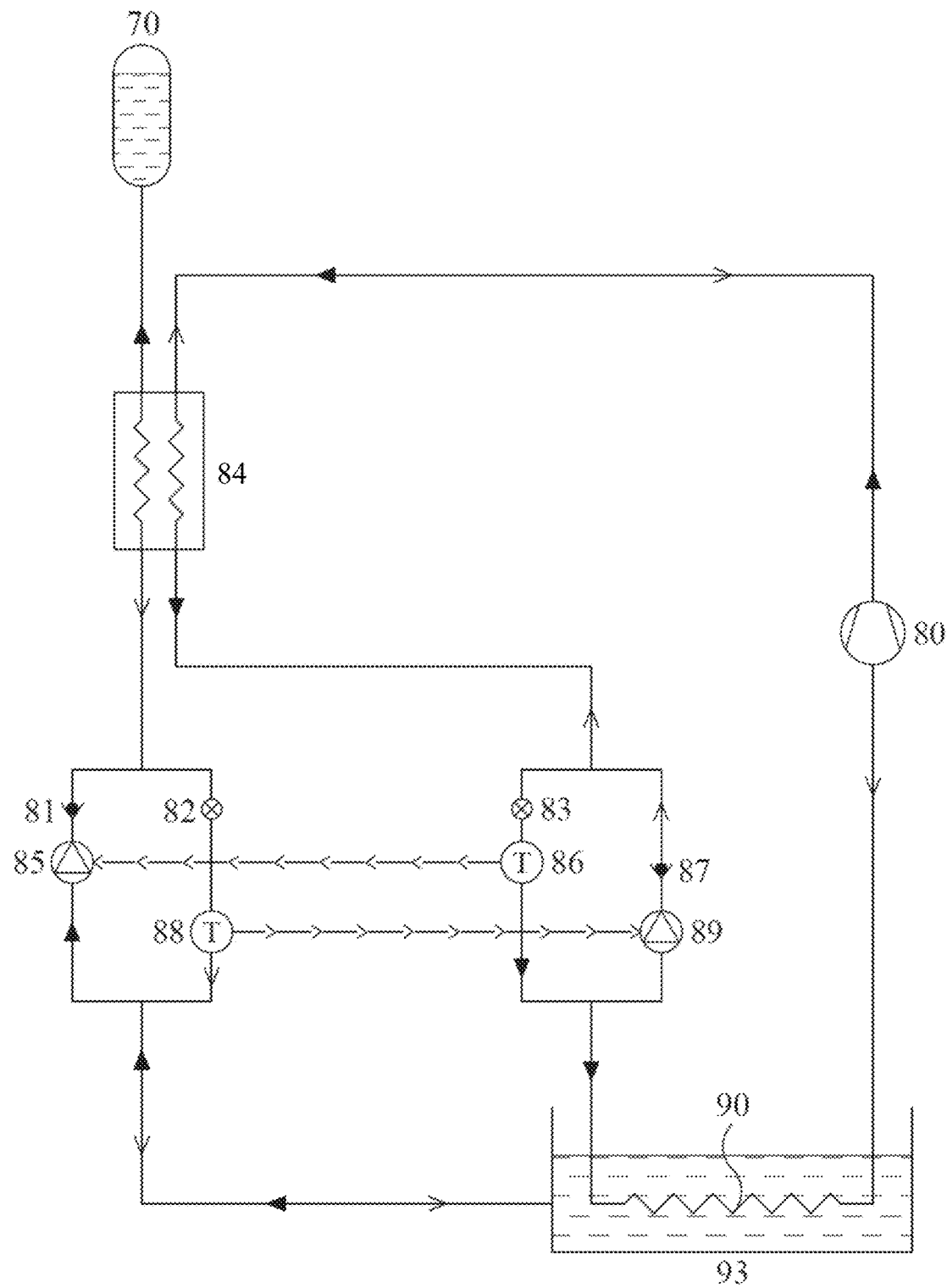
FIG. 10 shows an alternative two-tank energy storage system, working in conjunction with an exemplary trilateral cycle similar to that shown in FIGS. 2, 8 and 9.

FIG. 10 shows a two-tank, two-turbine system operating according to the principles of the systems of FIGS. 2, 8 and 9. The system of FIG. 10 is similar to the system of FIG. 2, except that the low-temperature energy storage tank 93 can be a large-volume water storage tank, a man-made or natural body of water, such as a pond, a lake, a river, a sea or an ocean, or even an external atmosphere (e.g., air outside a building). When the low-temperature energy storage tank 93 is a body of water or an external atmosphere, the heat exchanger 90 in the trilateral cycle 80-90-89-84 or 80-84-86-90 does not need to be close to (e.g., in thermal contact with) a similar heat exchanger in the energy storage system 70-84-88-93 or 93-85-84-70. When the low-temperature energy storage tank 93 is the external atmosphere, the water in the energy storage system simply passes through a pipe or tube (which may, for example, be thermally connected to a plurality of cooling fins) in the outside/outdoor air. The system of FIG. 10 operates similarly to the system of FIG. 2, in that the high-temperature energy storage tank 70 is self-pressurizing during charging. Thus, during discharging, the water from the high-temperature energy storage tank 70 can drive a turbine 88. Conversely, during charging, the trilateral cycle can drive a second turbine 86. When operating, each of the turbines 86 and 88 can drive a corresponding pump 85 or 89, respectively, in the other system.

The energy storage system in FIG. 10 comprises the high-temperature energy storage tank 70, a gradient heat exchanger 84, the turbine 88, a valve 82, a pump 85, a check valve 81, and the low-temperature energy storage tank 93. The trilateral cycle in FIG. 10 comprises a two-way expander/compressor 80, an isothermal (or substantially isothermal) heat exchanger 90 in or passing through the low-temperature energy storage tank 93, a pump 89, a check valve 87, the turbine 86, a valve 83, and the gradient heat exchanger 84. The valves 82 and 83 may comprise conventional manual or electronically-controlled valves. The trilateral cycle in FIG. 10 operates substantially identically to the trilateral cycles in FIGS. 2, 8 and 9.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An energy storage and retrieval system, comprising:
   a first low-temperature energy storage tank storing a first energy storage medium at a first temperature and having a pressurized gas therein;
   a high-temperature energy storage tank storing the first energy storage medium at a second temperature higher than the first temperature and having the pressurized gas therein;
   one or more first pressure changing devices configured to transport the first energy storage medium between the first low-temperature energy storage tank and the high-temperature energy storage tank;
   a first conduit fluidly connecting the pressurized gas in the low-temperature energy storage tank and the pressurized gas in the high-temperature energy storage tank;
   a gradient heat exchanger through which the first energy storage medium and the first conduit pass, configured to exchange heat between the first energy storage medium, the pressurized gas and a working fluid over a temperature range;
   a substantially isothermal heat exchanger through which a second energy storage medium passes, configured to exchange heat at a substantially constant temperature between the working fluid and the second energy storage medium;
   a compressor/expander in fluid communication with the gradient heat exchanger and the substantially isothermal heat exchanger, configured to change a pressure of the working fluid between the gradient heat exchanger and the substantially isothermal heat exchanger; and
   one or more second pressure changing devices between and in fluid communication with the gradient heat exchanger and the substantially isothermal heat exchanger, configured to transport the working fluid from the substantially isothermal heat exchanger to the gradient heat exchanger when the energy storage and retrieval system is discharging and from the gradient heat exchanger to the substantially isothermal heat exchanger when the energy storage and retrieval system is charging;
   a second low-temperature energy storage tank, configured to store the second energy storage medium; and
   a first pump configured to circulate the second energy storage medium from the second low-temperature energy storage tank, through the substantially isothermal heat exchanger, and back to the second low-temperature energy storage tank when the energy storage and retrieval system is charging and when the energy storage and retrieval system is discharging.

2. The energy storage and retrieval system of claim 1, wherein the first energy storage medium comprises water.

3. The energy storage and retrieval system of claim 1, wherein the one or more second pressure changing devices comprises:

a second pump configured to transport the working fluid from the substantially isothermal heat exchanger to the gradient heat exchanger when the energy storage and retrieval system is discharging; and a first turbine between the gradient heat exchanger and the substantially isothermal heat exchanger, driven by the working fluid when the energy storage and retrieval system is charging.

4. The energy storage and retrieval system of claim 1, wherein the one or more first pressure changing devices comprise:

a first circulation pump configured to transport the first energy storage medium from the low-temperature energy storage tank to the high-temperature energy storage tank when the energy storage and retrieval system is charging; and a second circulation pump configured to transport the first energy storage medium from the high-temperature energy storage tank to the low-temperature energy storage tank when the energy storage and retrieval system is discharging.

5. The energy storage and retrieval system of claim 1, wherein the one or more first pressure changing devices comprises a bidirectional pump.

6. The energy storage and retrieval system of claim 1, wherein the pressurized gas and the first conduit are configured to balance a first pressure in the high-temperature energy storage tank with a second pressure in the low-temperature energy storage tank.

7. The energy storage and retrieval system of claim 2, wherein the second energy storage medium comprises water.

8. A method of storing energy, comprising:

storing a first energy storage medium at a first temperature in a first low-temperature energy storage tank, the first low-temperature energy storage tank having a pressurized gas therein;

passing the first energy storage medium through a gradient heat exchanger;

compressing a working fluid;

passing the compressed working fluid through the gradient heat exchanger;

rejecting heat from the compressed working fluid to the first energy storage medium over a temperature range between the first temperature and a second temperature higher than the first temperature in the gradient heat exchanger, thereby heating the first energy storage medium and cooling the compressed working fluid;

storing the heated energy storage medium in a high-temperature energy storage tank at the second temperature, the high-temperature energy storage tank having the pressurized gas therein;

balancing a pressure in the high-temperature energy storage tank with a pressure in the first low-temperature energy storage tank using a conduit in fluid communication with the pressurized gas in each of the low-temperature and high-temperature energy storage tanks, wherein the conduit passes through the gradient heat exchanger;

exchanging heat between the pressurized gas and at least one of the first energy storage medium and/or the working fluid in the gradient heat exchanger;

storing a second energy storage medium in a second low-temperature energy storage tank;

circulating the second energy storage medium from the second low-temperature energy storage tank, through a substantially isothermal heat exchanger, and back to the second low-temperature energy storage tank using a pump; and exchanging heat between the working fluid and the second energy storage medium at a substantially constant temperature in the substantially isothermal heat exchanger, thereby changing a phase of the working fluid.

9. A method of retrieving stored energy, comprising:

storing a first energy storage medium at a first temperature in a high-temperature energy storage tank, the high-temperature energy storage tank having a pressurized gas therein;

passing the first energy storage medium through a gradient heat exchanger;

passing a working fluid in a trilateral cycle through the gradient heat exchanger;

rejecting heat from the first energy storage medium to the working fluid over a temperature range between the first temperature and a second temperature lower than the first temperature in the gradient heat exchanger, thereby heating the working fluid and cooling the first energy storage medium;

storing the cooled first energy storage medium at the second temperature in a first low-temperature energy storage tank, the first low-temperature energy storage tank having the pressurized gas therein;

balancing a pressure in the high-temperature energy storage tank with a pressure in the first low-temperature energy storage tank using a conduit in fluid communication with the pressurized gas in each of the high-temperature energy storage tank and the first low-temperature energy storage tank, wherein the conduit passes through the gradient heat exchanger;

exchanging heat between the pressurized gas and at least one of the expanded working fluid and the first energy storage medium in the gradient heat exchanger;

storing a second energy storage medium in a second low-temperature energy storage tank;

expanding the heated working fluid;

circulating the second energy storage medium from the second low-temperature energy storage tank, through a substantially isothermal heat exchanger, and back to the second low-temperature energy storage tank using a pump; and exchanging heat between the expanded working fluid and the second energy storage medium at a substantially constant temperature in the substantially isothermal heat exchanger, thereby changing a phase of the expanded working fluid.

10. The method of claim 8, further comprising:

driving a turbine with the cooled, compressed working fluid.

11. The energy storage and retrieval system of claim 1, wherein the first pump comprises a reversible propeller pump.

12. The energy storage and retrieval system of claim 11, wherein a temperature difference of the second energy storage medium after it passes through the substantially isothermal heat exchanger is about 0° C.

13. The method of claim 8, wherein the pump comprises a reversible propeller pump.

14. The method of claim 9, wherein the pump comprises a reversible propeller pump.

* * * * *